United States Patent
Barnes

(10) Patent No.: US 6,342,154 B2
(45) Date of Patent: *Jan. 29, 2002

(54) ASSEMBLY FOR PURIFYING WATER

(76) Inventor: Ronald Barnes, 3122-12th Ave., Huntsville, AL (US) 35807

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,915

(22) Filed: Oct. 15, 1999

(51) Int. Cl.$^7$ .................................................. C02F 1/78
(52) U.S. Cl. .................. 210/97; 210/123; 210/188; 210/205; 422/186.12; 96/168; 96/250
(58) Field of Search ................... 210/760, 192, 210/748, 123, 120, 900, 97, 188, 205, 218, 750; 422/186.07, 186.08, 186.12; 261/DIG. 42; 137/410; 96/247, 250, 168; 251/129.2

(56) References Cited

U.S. PATENT DOCUMENTS

| | | | | |
|---|---|---|---|---|
| 2,721,577 A | * | 10/1955 | Esselman | |
| 3,448,045 A | * | 6/1969 | Hess et al. | |
| 3,996,136 A | * | 12/1976 | Jakubek et al. | |
| 4,688,699 A | * | 8/1987 | Goudy, Jr. et al. | |
| 5,082,558 A | * | 1/1992 | Burris | |
| 5,207,993 A | * | 5/1993 | Burris | |
| 5,213,773 A | * | 5/1993 | Burris | |
| 5,376,265 A | * | 12/1994 | Szabo | |
| 5,888,389 A | * | 3/1999 | Griffith | |
| 5,989,439 A | * | 11/1999 | Persinger | |
| 6,096,221 A | * | 8/2000 | Kerchouche et al. | |
| 6,146,524 A | * | 11/2000 | Story | |

* cited by examiner

Primary Examiner—Joseph W. Drodge
Assistant Examiner—Terry K. Cecil
(74) Attorney, Agent, or Firm—Kenneth H. Jack; Davis & Jack, L.L.C

(57) ABSTRACT

An assembly for purifying water includes a high intensity ultraviolet light or corona discharge ozone generator 4 and output line 15 for introducing ozone into a tube 20 carrying water to be treated. Downstream of the ozone injection point 22 is an ozone contact time segment 24 that terminates at an input port of a bubble separator column 26. The column includes a water level hysteresis inducing means that is adapted to cause water within the column to continuously alternately fill and purge between an upper and a lower water level in order to enhance ozone concentration. The hysteresis inducing means may include a water level sensitive electrically actuated valve 38.

20 Claims, 2 Drawing Sheets

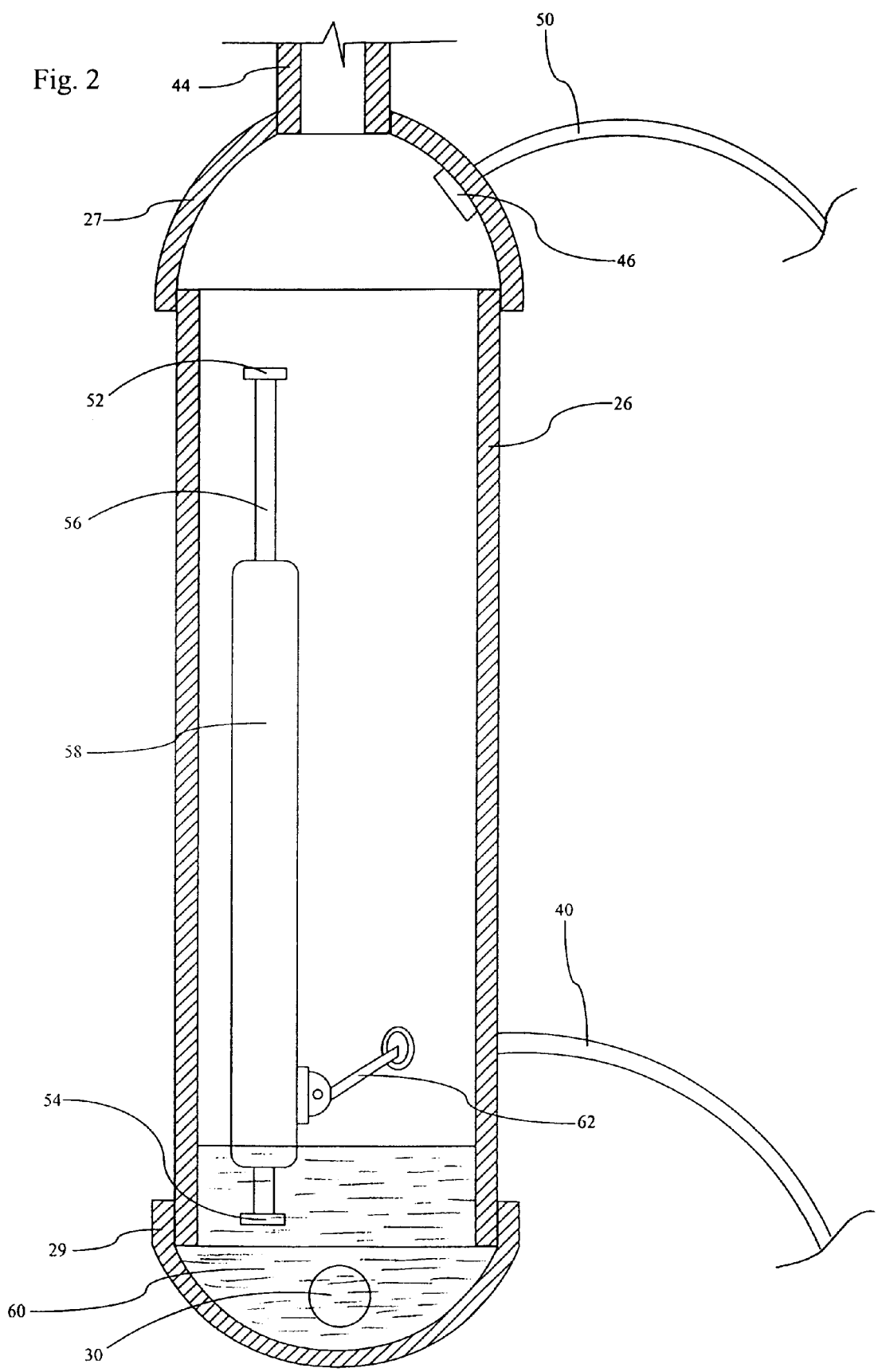

ASSEMBLY FOR PURIFYING WATER

FIELD OF THE INVENTION

This invention relates to water purification systems. More particularly, this invention relates to water purification systems incorporating ozone injection means.

BACKGROUND AND SUMMARY OF THE INVENTION

Commonly known ozone water purification systems comprise the elements of an ozone gas generating apparatus, a water carrying tube including an ozone contact time segment, and a bubble separating column or chamber. The ozone generating apparatus typically comprises a cylindrical chamber through which atmospheric air containing diatomic oxygen is pumped or drawn. Radiation from a lamp capable of emitting intense ultraviolet light having a wave length of approximately 185 nanometers excites the diatomic oxygen within the chamber. As a result of such molecular excitation, a fraction of the diatomic oxygen within the chamber is split, producing free atoms of oxygen. As a result of their extremely high chemical reactivity, free oxygen atoms within the chamber rapidly react with the remaining intact oxygen, forming molecules having three atoms of oxygen. Molecules consisting of three oxygen atoms are commonly referred to as ozone or $O^3$ gas.

Another commonly known means of producing ozone gas within such a chamber is to introduce closely spaced electrodes therein and to induce a sufficient electrical potential difference between the electrodes to produce electric discharge arcing. Diatomic oxygen molecules in close proximity with such electrical arcing similarly degrade into free oxygen atoms which quickly react with diatomic oxygen to form ozone gas.

In commonly known configurations of ozone water purification systems ozone rich air which emits from the ozone generator apparatus is introduced into a stream of water in need of purification, such water typically moving through a tube. Where the air within the ozone generating apparatus is pressurized by, for example, an air compressor, the output of the ozone generator may be introduced into the water carrying tube by means of a simple air line interlinking the output of the ozone generator and an aperture extending through the wall of the water carrying tube. Alternately, the air line may terminate at a venturi installed in line with the tube, creating a localized venturi effect at the output end of the air line. Use of a venturi allows the kinetic energy of water within the water carrying tube to perform work upon the air within the air line, drawing air from the ozone generator through the air line and into the stream of water.

Ozone carrying air which is either injected into the contaminated water stream or drawn into the stream by a venturi initially exists in the form of air bubbles. In order for the ozone gas to have a purifying effect upon the water, such gas must be dissolved into the water. Dissolution of the gas into the water necessarily occurs at the spherical surface tension boundaries between the gas and the water. A high solubility differential between common air components and ozone gas causes the ozone within such air bubbles to dissolve more quickly than other gases. Nevertheless, ozone carrying bubbles must remain immersed in water a sufficient length of time to achieve sufficient dissolution of ozone.

In commonly configured ozone water purification systems, the water carrying tube serves dual functions, both transporting water containing dissolved ozone to its desired destination, and providing an elongated immersion chamber where air bubbles containing ozone may remain in contact with the water a sufficient length of time for dissolution. In order for ozone dissolution to occur within the water carrying tube, the tube must have a sufficient length, i.e., an ozone contact time length. The contact length of the tube typically is approximately three feet in length. However, the length may vary between one foot and four feet depending upon variables such as rate of flow within the tube, turbulence and water temperature. Sharp turns within the tube or turbulence inducing baffles or screens installed within the bore of the water carrying tube may serve the function of breaking larger ozone carrying bubbles into smaller bubbles, increasing the overall surface area of the bubbles, and increasing the rate of dissolution of ozone.

Air bubbles injected by the ozone generating apparatus into the water carrying tube cease to serve a useful function upon reaching the end of the contact length of the tubing. At that point, substantially all ozone with the air bubbles is dissolved into the surrounding water, leaving residual bubbles consisting largely of normal atmospheric gases. In many circumstances, the continued presence of such gas bubbles within a water purification system is undesirable. For example, where the system recycles ozone bearing water in a feedback loop through a water pump, bubbles may cause the pump to lose its prime or cavitate. Also, it is often undesirable to introduce a stream of bubble carrying water directly into a tank of drinking water. Similarly, it is undesirable for air bubbles to emit from the water jets of a swimming pool. Thus, it is desirable to remove the air bubbles after dissolution of the ozone.

In order to remove air bubbles from a water purification system after dissolution of ozone, a bubble separator is often utilized, the bubble separator commonly comprising a hollow cylinder having an upper water input port, a lower water output port, and an upper off gassing vent. Typically, the water input port is continuous with the downstream end of the water carrying tube. Typically, the bubble separator is oblongated and is oriented so its long axis is vertical.

In operation, such a bubble separator removes air bubbles by reducing the velocities of currents of water within the bubble separator to a rate slow enough to allow bubbles to rise to the top of the bubble separator. The bubbles then emit as harmless atmospheric gases through the off gassing vent in the ceiling of the bubble separator, rather than continuing to flow downstream through the output end of the bubble separator. Preferably, the output flow of the bubble separator is adjusted to prevent over filling. Also preferably, a float valve or solenoid controlled valve installed within the off gassing vent assures that water will not escape from the system through the vent.

Where water bearing dissolved ozone gas is poured into a body of water such as, for example, a swimming pool, the ozone beneficially reacts with various contaminants. For example, ozone rapidly reacts with metal ions within the water, forming precipitants which may be removed through filtration. Ozone within water also degenerates or causes lysis of the cell walls of bacteria, killing the bacteria. Ozone within water also beneficially oxidizes and neutralizes sulfides, nitrates, cyanides, detergents, and pesticides. In all such cases, the efficacy of ozone in reacting with such contaminants is enhanced by reducing the average physical distance between contaminant organisms or molecules and the molecules of ozone within the water. In a large volume of water, such as a drinking water storage tank, spa, or swimming pool, the concentration of dissolved ozone becomes undesirably low, slowing the rate at which the ozone reacts with contaminants. To prevent such dilution of ozone concentration, it is desirable to first introduce the ozone carrying water into a reaction chamber having a smaller interior volume which maintains higher concentrations of ozone.

The instant invention eliminates the necessity of installing a separate concentration enhancing chemical reaction chamber by causing a bubble separator to additionally serve such function. Such effect is accomplished by applying a water level sensitive valve to the bubble separator's output. Particularly, the water level sensitive controlled valve is adapted to cause the bubble separator to undergo hysteresis, continuously alternately collecting and discharging the water.

Several valve control means are capable of causing a vessel such as the above described bubble separator to continuously alternately fill and purge In an all mechanical example, a floating flap valve, such as is utilized to control the output from a common toilet tank, may be installed to alternately overlie and pivotally move from an output aperture within the floor of the bubble separator, such floating flap valve being mechanically linked to a buoy or float, the length of the linkage being calibrated to allow the float to buoyantly open such floating flap valve when the water level within the bubble separator reaches a desired upper level. A preferred electro-mechanical example comprises a float, a float carrying frame, an electric toggle switch, a power source, and an electric solenoid valve. In such exemplary electro-mechanical control assembly, the toggle switch is mounted upon the inner wall of the bubble separator so that its switch lever extends into the interior of the bubble separator, and so that its positive and negative electric contacts are accessible by lead wires extending through the wall of the bubble separator. The float carrying frame is preferably pivotally mounted upon the lever arm of the toggle switch. The float is preferably slidably mounted upon the frame so that as the float buoyantly rises, the float upwardly trips the toggle switch, and so that as the float sinks to a lower level, the weight of the float downwardly trips the toggle switch. Exterior to the bubble separator, the toggle switch forms a part of an electric circuit including the electric power source and the electric controlled valve, such valve preferably being a solenoid valve. Alternately, such valve may be actuated by an electric motor. Such a valve preferably has a spring actuated normally open position. Where the solenoid valve is normally open, the electric circuit is opened by the buoyant action of the float upon reaching the upper end of the frame, and the electric circuit is closed by the weight of the float upon reaching the lower end of the frame. Numerous other means, such as an electric water sensor controlled solenoid valve may be utilized to cause the water within the bubble separator to continuously alternately collect and discharge.

By continuously alternately collecting and discharging the water within the bubble separator, ozone within the water is allowed time to react with contaminants in a high concentration environment.

Accordingly, it is an object of the present invention to provide an ozone based water purification system which incorporates in series an ozone generating apparatus, an ozone contact time tubing segment, and a bubble separating chamber.

It is a further object of the present invention to provide such a system wherein the bubble separating chamber performs the dual functions of removing air bubbles from water to be purified, and serving as a low volume chemical concentration chamber.

Other objects and benefits of the present invention will become known to those skilled in the art upon review of the Detailed Description which follows, and upon review of the appended drawings.

BRIEF DESCRIPTION OF THE DRAWINGS

FIG. 2 is a sectional view of a component of the assembly as indicated in FIG. 1.

DETAILED DESCRIPTION OF THE PREFERRED EMBODIMENT

Figure 1:
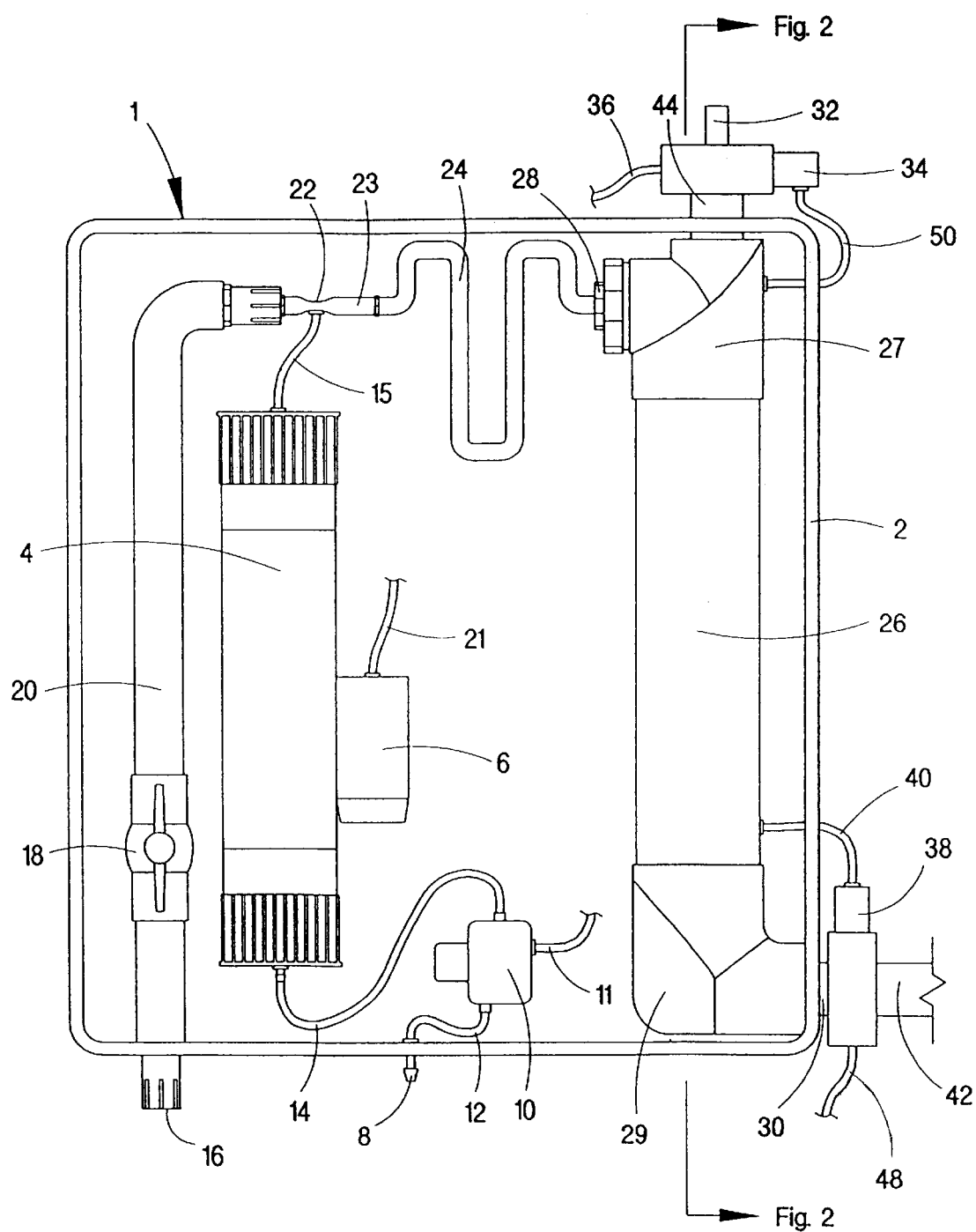
FIG. 1 is a representational diagram of the instant inventive assembly, components thereof being shown encased within a housing.

Referring now to the drawings, and in particular to FIG. 1, the instant inventive assembly for purifying water is referred to generally by reference arrow 1. Preferably, the major components of the assembly 1 are housed within a rigid casing 2. Such casing 2 conveniently compartmentalizes the assembly 1 for use in conjunction with pool plumbing systems, spa plumbing systems, drinking water systems and the like.

Referring further to FIG. 1, the assembly for purifying water 1 preferably has two fluid input ports, they being an atmospheric air input port 8 and a contaminated water input port 16. Atmospheric air is drawn into and through the air input port 8 preferably by means of an electric motor driven air compressor 10, electrical power being supplied to the air compressor 10 via an electrical power cord 11. (Electrical circuitry and wiring of the assembly is common and is not completely shown.) Compressed air from the air compressor 10 is preferably driven through air line 14 into and through a high intensity ultraviolet light ozone gas generator 4, such ozone generator 4 having an electric ballast 6 powered via electric power cord 21. The high intensity ultra-violet light ozone generator 4 has a hollow bore through which the atmospheric air passes, the hollow bore typically having an axially mounted ultraviolet light emitting element. Exposure of diatomic oxygen or $O_2$ within the bore of the ozone generator 4 to the ultraviolet light breaks down such molecules, producing free atomic oxygen which rapidly reacts with unbroken $O_2$ molecules to form ozone or $O_3$ gas.

Suitably and alternately, a corona discharge ozone gas generator may be used in place of a high intensity ultraviolet light ozone generator. Electrical arcing within a corona discharge ozone generator similarly acts upon $O_2$ to form $O_3$ ozone gas.

Referring further to FIG. 1, air containing an enhanced concentration of ozone gas exits the output end of the ozone generator 4 to pass through an output air line 15. Simultaneously with the flow of such atmospheric air, water in need of purification is pumped into water input port 16 and thence through a water carrying tube 20; the flow through such tube 20 being selectively terminable by a manual shut off valve In operation of the assembly 1, contaminated water carried through the water carrying tube 20 combines with air having enhanced quantities of ozone gas at an ozone injection point 22. The ozone injection point 22 is preferably configured as a venturi 23 which draws ozone gas bearing air through the ozone generator 4 and through the output air line 15. Where water is pumped through the water carrying tube 20 at a high velocity, the venturi 23 typically has sufficient pumping power alleviate the need for actuation of the air compressor 10. Preferably, both the air compressor 10 and configuration of the ozone gas injection point 22 as a venturi 23 are utilized in order to assure a sufficient flow of ozone bearing air under all conditions.

Referring further to FIG. 1, air flowing downstream from the ozone gas injection point 22 initially exists in the form of bubbles immersed within the contaminated water. Necessarily, the ozone gas within such bubbles is dissolved within the water in order to beneficially react with and purify water-born pathogens and contaminants. A lengthened ozone contact time segment of tubing 24 preferably extends downstream from the ozone gas injection point 22; such segment 24 assuring that gas bubbles containing ozone gas remain submerged within the contaminated water a length of time sufficient to allow dissolution of the ozone. Preferably, the ozone contact time segment 24 has a series of sharply angled turns creating internal water turbulence. Water turbulence within the contact time segment 24 desirably breaks larger bubbles into smaller ones, increasing their total surface area, thereby increasing the rate of dissolution of ozone gas. Suitably, other water turbulence inducing means such as strainers and baffles may be installed within the interior bore of the ozone contact time segment 24. The appropriate length of the contact time segment 24 varies depending upon factors such as water flow speed, volume of injected gas, and water temperature.

Referring further to FIG. 1, water emitting from the ozone contact time segment 24 typically includes contaminants, dissolved ozone gas, and submerged bubbles of other atmospheric gases. The presence of bubbles of other gases at such point results from the fact that ozone gas is much more soluble within water than common air components such as nitrogen, oxygen, and carbon dioxide. At the point dissolution of the ozone gas becomes substantially complete, bubbles of such other gases typically remain. The water, including contaminants, bubbles, and including dissolved ozone, emits from the downstream end of the ozone contact time segment 24 to enter a water inlet port 28 of a hollow bored bubble separator column 26.

Referring simultaneously to FIGS. 1 and 2, the bubble separator column 26 serves the function of separating undesirable bubbles from the water. As water flows through the water inlet port 28 and thence downward through the hollow bore of the bubble separator column 26, bubbles within the water buoyantly rise upward and emit from the bubble separator column 26 through an off gassing vent 44. Preferably, the upper and lower ends of the bubble separator column 26 are closed by upper and lower caps 27 and 29, such caps being apertured at input port 28, the off gassing vent 44, and at an output port 30.

Referring further to FIGS. 1 and 2, the flow of fluids, gaseous and liquid, through the off gassing vent 44 is preferably controlled by a solenoid valve 34, such valve 34 receiving its power supply via a power cord 36. The solenoid valve 34 is preferably spring biased to a normally open position. In the event the water level within the bubble separator column 26 rises excessively, immersion of a water sensitive switch 46 actuates the solenoid valve 34 by closing a Circuit including the valve power supply 36 and switch leads 50. Upon such actuation, the solenoid valve 34 closes the off gassing vent 44, preventing water from undesirably spilling from output tube 32. Suitably, float actuated switches may be utilized for actuation of valve 34. Also suitably, a float actuated mechanical flap valve may be utilized in place of the solenoid valve 34.

Further referring simultaneously to FIGS. 1 and 2, it is desirable that water containing pathogens or undesirable dissolved solids contain a high concentration of dissolved ozone gas for a length of time sufficient to allow beneficial reactions between the dissolved ozone gas molecules and the contaminants. Accordingly, in the instant inventive assembly, the bubble separator column 26 further functions as an enhanced concentration chemical reaction Chamber. Performance of such function is accomplished through the installation of a solenoid valve 38 which controls water flow through the lower outlet port 30 of the bubble separator column 26. Preferably, the solenoid valve 38 is spring biased in a normally open position, assuring that water continues to flow out of the bubble separator column 26 upon cut off of electrical power.

Further referring simultaneously to FIGS. 1 and 2, a common toggle switch 62 has water sealed terminal leads 40 which extend through the wall of the bubble separator column, such leads 40 extending to the solenoid valve 38 and making up a part of such valve's power supply circuit, such power supply circuit including a power cord 48. As water 60 within the interior bore of the bubble separator column 26 rises, a float 58 slidably mounted over a slide bar 56 buoyantly rises. The slide bar 56 is preferably fixedly mounted at its upper and lower ends upon the inner wall of the bubble separator column 26 by means of upper and lower float support brackets 52 and 54. As the float 58 upwardly rises, a toggle switch 62 pivotally linked to the float 58, is tripped upwardly, breaking the electrical circuit powering the solenoid valve 38. As the water level within the bubble separator column 26 falls, the weight of the float 58 downwardly trips the toggle switch, closing such electric circuit, and actuating the solenoid valve 34 to interrupt the flow of water emitting from the water outlet port 30. Preferably, the buoyancy and weight of the float 58, along with the trip pressure of the toggle switch 62 are calibrated so that the switch 62 trips upwardly only after the water level sufficiently rises, and so that the switch 62 trips downwardly only after the water level reaches a sufficiently low point.

The interaction between the float 58, the toggle switch 62, and the solenoid valve 38 produces a hysteresis effect, causing the water level within the bubble separator column 26 to cyclically rise and fall, continuously alternately collecting and discharging the water 60. Such hysteresis effect provides for beneficial chemical reactions of ozone with contaminants in a water environment including enhanced concentrations of dissolved ozone.

Suitably and alternately, a float actuated mercury switch (not drawn) may be used as a substitute for the toggle switch 62. Also suitably, upper and lower water sensing switches (not drawn) may be utilized in place of float actuated mercury or toggle switches. Also suitably, a wholly mechanical float actuated floating flap valve (not drawn) may be utilized to induce the desired cyclical collection and discharge of water within the bubble separator column 26. Numerous other suitable means for inducing cyclical collection and discharge of water within the bubble separator column 26 may be utilized.

Referring to FIG. 1, purified water emitting from output port 42 of the assembly for purifying water 1 may be routed directly to the body of purified water (e.g., a tank of drinking water, a swimming pool, a whirlpool or hot tub). Alternately, water emitting from output port 42 may be routed to a point upstream of an input port of a water pump (not drawn) which drives water into the water input port 16; such routing creating a feedback loop for enhanced water purification. Where a feedback loop is utilized, a flow divider is necessarily installed to split the flow of water between the inventive water purifying assembly 1 and the body of water to be purified.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An assembly for purifying water, the assembly comprising:
   (a) a tube for carrying the water, the tube having an upstream end and a downstream end;
   (b) means for introducing ozone into the tube at an ozone introduction point within the tube for carrying water;
   (c) ozone dissolving means situated between the ozone introduction point and the downstream end of the tube for carrying water;
   (d) a bubble separator column having a water input port, a water output port, an upper water level, and a lower water level, the downstream end of the tube for carrying water being positioned so that water emitting therefrom may pass through the water input port; and
   (e) water level hysteresis inducing means adapted for causing the bubble separator column to continuously alternately fill and purge between the upper and lower water levels.

2. The assembly of claim 1 wherein the ozone introduction means comprises an ozone generator selected from the group of high intensity ultraviolet light ozone generators, and corona discharge ozone generators.

3. The assembly of claim 2 wherein the ozone dissolving means comprises an ozone contact time segment, the ozone contact time segment being contiguous with the tube for carrying water, the ozone contact time segment being situated between the ozone introduction point and the downstream end of the tube for carrying water.

4. The assembly of claim 3 wherein the bubble separator column has an upper end and a lower end, wherein the water input port is positioned at the upper end of the bubble separator column; and wherein the water output port is positioned at the lower end of the bubble separator column.

5. The assembly of claim 4 wherein the water level hysteresis inducing means comprises an electrically actuated valve for alternately opening and closing the water output port of the bubble separator column.

6. The assembly of claim 5 wherein the water level hysteresis inducing means further comprises a water level sensitive electric switch for alternately actuating the electrically actuated valve to open the water output port of the bubble separator column when the water level within the bubble separator column approaches the upper end of the bubble separator column, and counter-actuating the electrically actuated valve to close said water output port when said water level approaches the lower end of the bubble separator column.

7. The assembly of claim 6 wherein the water level sensitive electric switch comprises a switch selected from the group of float actuated mechanical switches, float actuated mercury switches, and water sensor controlled switches.

8. The assembly of claim 7 wherein the ozone dissolving means further comprises means for inducing turbulence within water flowing through the ozone contact time segment.

9. The assembly of claim 8 wherein the upper end of the bubble separator column has an off gassing vent.

10. The assembly of claim 9 further comprising means for preventing water flow through the off gassing vent.

11. The assembly of claim 10 wherein the means for preventing water flow through the off gassing vent comprises a valve selected from the group of electrically actuated valves and float actuated valves.

12. The assembly of claim 11 wherein the means for introducing ozone further comprises a venturi.

13. The assembly of claim 11 wherein the means for introducing ozone further comprises an air compressor for driving air through the ozone generator.

14. The assembly of claim 11 wherein the valve is an electrically actuated valve comprising a magnetic shaft driven by an electric solenoid.

15. The assembly of claim 11 wherein the valve is an electrically actuated valve comprising electric motor means.

16. The assembly of claim 4 wherein the water level hysteresis inducing means comprises a float actuated valve for alternately opening and closing the water output port of the bubble separator column.

17. The assembly of claim 16 wherein the ozone dissolving means further comprises means for inducing turbulence within water flowing through the ozone contact time segment.

18. The assembly of claim 17 wherein the upper end of the bubble separator column has an off gassing vent.

19. The assembly of claim 18 further comprising means for preventing water flow through the off gassing vent.

20. The assembly of claim 19 wherein the means for introducing ozone further comprises a venturi.

* * * * *